US012804786B2

(12) United States Patent
Jacobson

(10) Patent No.: US 12,804,786 B2
(45) Date of Patent: Nov. 17, 2026

(54) SYSTEM AND METHOD FOR HARMONIZED COLOR TEMPERATURE CONTROL

(71) Applicant: Crestron Electronics, Inc., Rockleigh, NJ (US)

(72) Inventor: Doug Jacobson, Oradell, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 82 days.

(21) Appl. No.: 19/012,287

(22) Filed: Jan. 7, 2025

(65) Prior Publication Data

US 2026/0190202 A1 Jul. 2, 2026

Related U.S. Application Data

(60) Provisional application No. 63/739,249, filed on Dec. 27, 2024.

(51) Int. Cl.

| | |
|---|---|
| ***H05B 47/155*** | (2020.01) |
| ***H05B 45/12*** | (2020.01) |
| ***H05B 45/22*** | (2020.01) |
| ***H05B 47/165*** | (2020.01) |
| ***H05B 47/175*** | (2020.01) |

(52) U.S. Cl.

CPC ........... *H05B 47/155* (2020.01); *H05B 45/12* (2020.01); *H05B 45/22* (2020.01); *H05B 47/165* (2020.01); *H05B 47/196* (2024.01)

(58) Field of Classification Search

CPC ...... H05B 47/155; H05B 45/12; H05B 45/22; H05B 47/165; H05B 47/196

See application file for complete search history.

(56) References Cited

U.S. PATENT DOCUMENTS

2022/0342373 A1* 10/2022 Ho ........................ H05B 47/155
2025/0365838 A1* 11/2025 Altonen ............... H05B 47/175

FOREIGN PATENT DOCUMENTS

WO WO-2022056180 A1 * 3/2022 ........... H05B 47/185
WO WO-2026080708 A1 * 4/2026 ............. G08C 17/02

* cited by examiner

*Primary Examiner* — Abdullah A Riyami
*Assistant Examiner* — Syed M Kaiser

(57) ABSTRACT

Systems, methods, and modes for harmonized color temperature control of lighting loads. The system comprises a plurality of load control devices for controlling a plurality of lighting loads installed in a space and at least one controller comprising a warm-dim curve represented by a relationship between a plurality of intensity levels and corresponding color temperature levels. The at least one controller receives a control command associated with a target intensity level for at least one of the plurality of lighting loads, receives current intensity levels and/or color temperature levels of other lighting loads of the plurality of lighting loads, determines a harmonized color temperature level, commands to drive the at least one lighting load at the target intensity level, while the other lighting loads remain at their current intensity levels, and commands to drive the plurality of lighting loads at the harmonized color temperature level.

26 Claims, 8 Drawing Sheets

400

SYSTEM AND METHOD FOR HARMONIZED COLOR TEMPERATURE CONTROL

BACKGROUND OF THE INVENTION

Technical Field

Aspects of the embodiments relate to building control systems, and more specifically to systems, methods, and modes for harmonized color temperature control of lighting loads.

Background Art

Building automation is ever evolving to provide consumers with convenient and simple control and monitoring of various mechanical and electrical equipment within a building through a building control system. Automation systems provide comfort, convenience, simplicity, and security, as well as lower energy costs. They integrate various electrical and mechanical system elements within a building or a space, such as a residential home, commercial building, hotels, or individual rooms, including meeting rooms, lecture halls, or the like. By utilizing a network of control devices and sensors distributed throughout a residential or commercial building, automation systems control and provide information of the mechanical and electrical equipment within the building. Such systems can control one or more of heating, ventilation and air conditioning (HVAC), lighting, shading, security, appliances, door locks, and audiovisual (AV) equipment, among others, for every space in each facility.

The control of lighting in buildings is an important aspect of building automation. Lighting control systems offer the ability to change the ambience of a room, schedule lighting events, and create lighting scenes. The advance in light emitting diode (LED) technology enhances the ability to create lighting effects. In addition to dimming, LEDs allow the manipulation of color and color temperature. Color temperature is a description of the warmth or coolness of a light source, typically expressed in Kelvins (K)—with a typical range of between about 2000K (warm colors) to above 5500K (cool colors). Yet, the control of LED light sources comes with its own challenges. Natural light gets cooler and brighter during the day and warmer and dimmer during the night. Incandescent bulbs simulate this effect when being dimmed and thereby are more appealing to the human eye. LEDs, however, retain their color independently of intensity, such that when a cool colored LED light is dimmed it stays cool and unappealing to the observer. To achieve more natural dimming, LEDs are used that can change their color temperature and which are configured to behave more closely to incandescent bulbs by adjusting the color temperature of the LEDs as a function of the intensity. For example, "warm-dim" LED bulbs utilize a color temperature versus intensity curve that lowers the color temperature as the intensity is lowered, and raises the color temperature as the intensity increases. So for example, a bulb that is at 3000K at 100% intensity could go down to 1650K at 1% intensity.

Many rooms have more than one lighting load that may be separately controlled and it is common to have different lighting loads at different light intensities in a single room or space. Different dimming levels may be set because different loads may give off more light than others, or to create a specific lighting effect. Discrete dimming control of such warm-dim sources results in a room with different color temperatures, which is undesirable and unsightly. For one thing, many warm-dim bulbs on the market today are designed to be controlled with traditional dimmers where there is no ability to control the intensity and the color temperature independently from one another. Other light fixtures may be "tunable"—meaning that the color temperature and intensity can be adjusted independently—and controls for such fixtures may also offer a warm-dim option. But while this would enable more sophisticated algorithms, the resulting color temperatures are distinctly determined and still would not be harmonized with other light sources in a given space. For example, the downlights in the kitchen may be at 90% intensity, while under-cabinet lighting may be at 20% intensity, and the sconces at 50% intensity. In such a scenario, the lighting loads in such a room will illuminate at different color temperatures, which will impede the sought for lighting effect. The room will look more appealing when all the lights in a room or a space have harmonized color temperature, even when they are at different intensities.

Accordingly, a need has arisen for an apparatus, system, and method for harmonized color temperature control of lighting loads.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for harmonized color temperature control of lighting loads.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
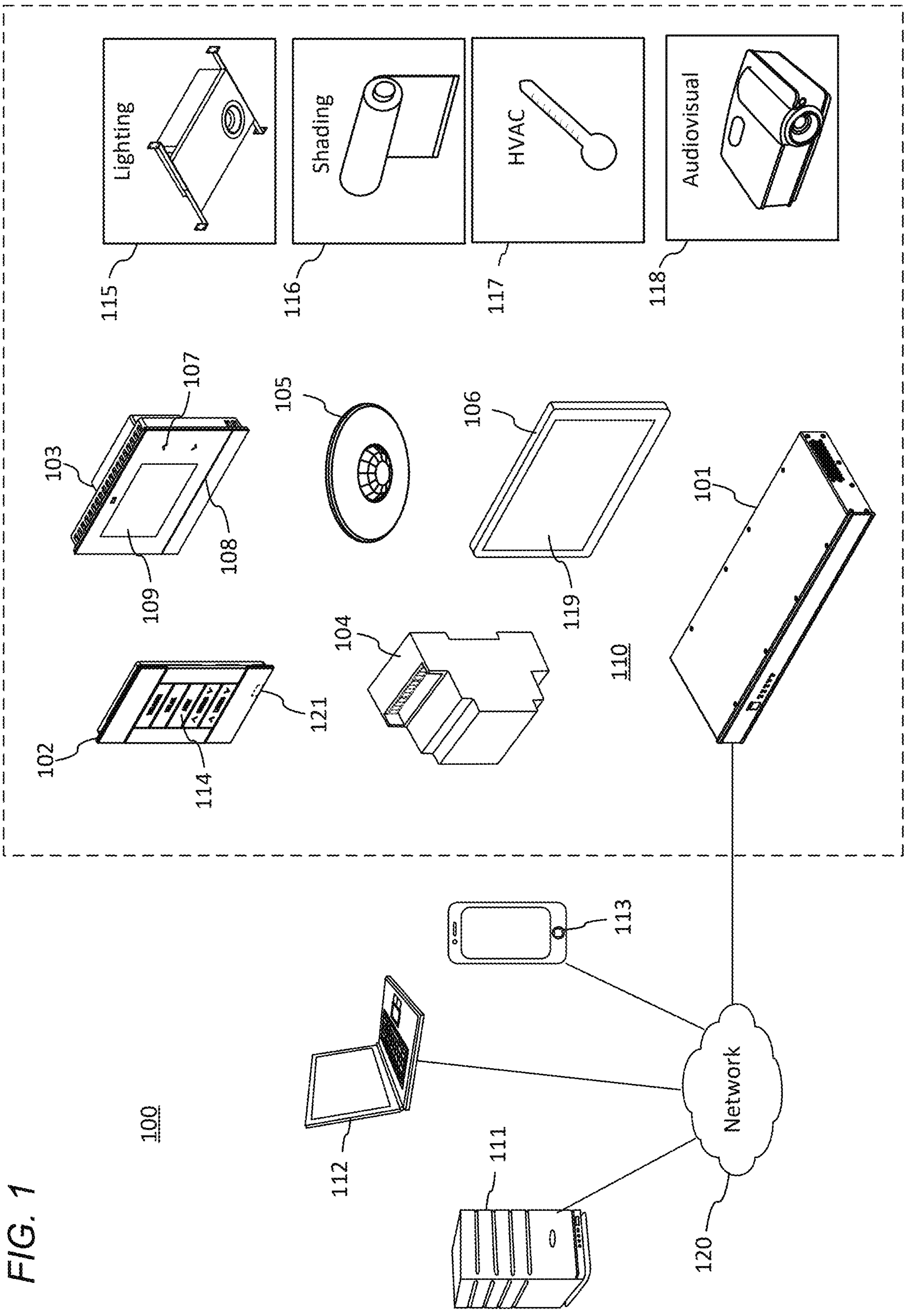

FIG. 1 illustrates a control system according to an illustrative embodiment.

Figure 2:
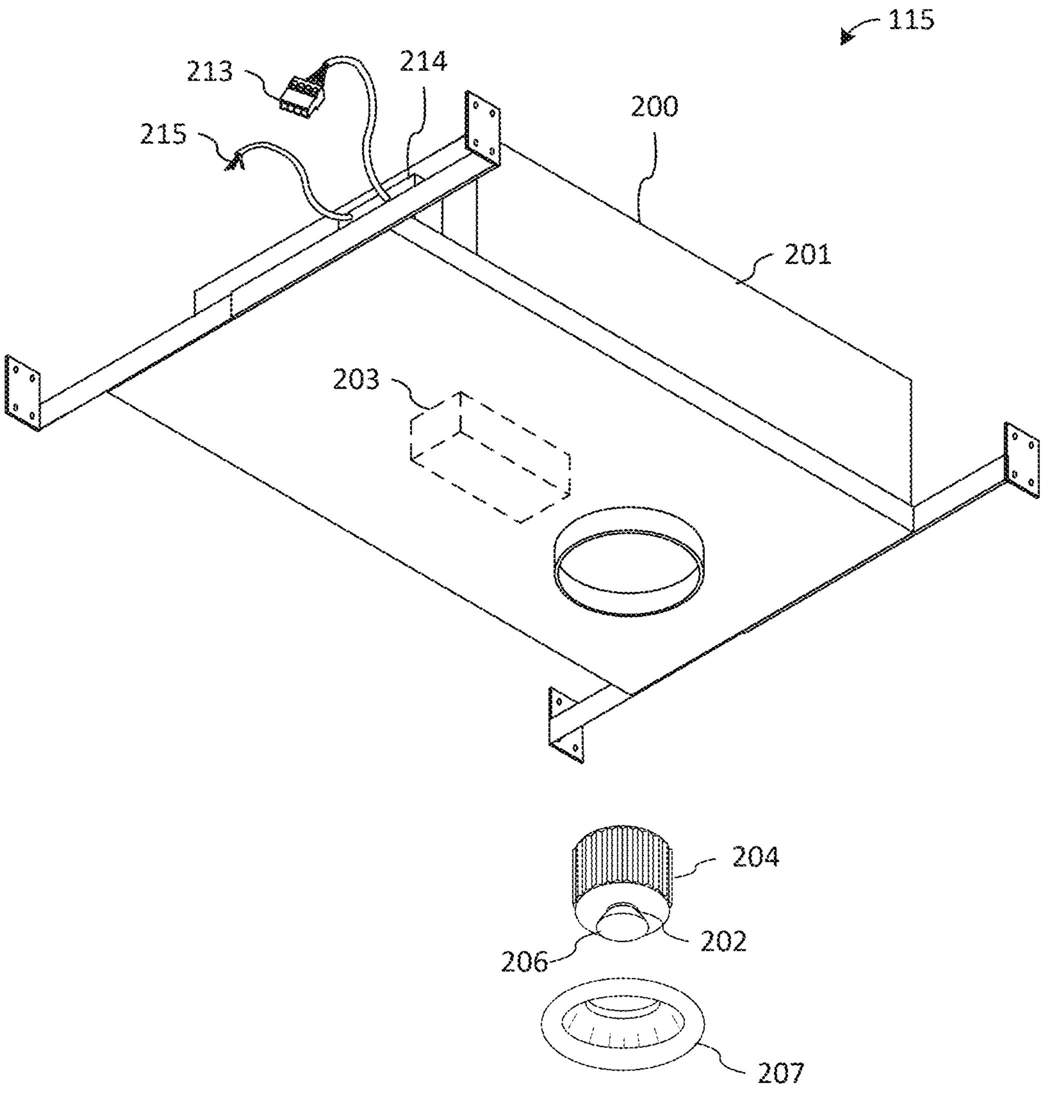

FIG. 2 illustrates a perspective view of an exemplary lighting device according to an illustrative embodiment.

Figure 3A:
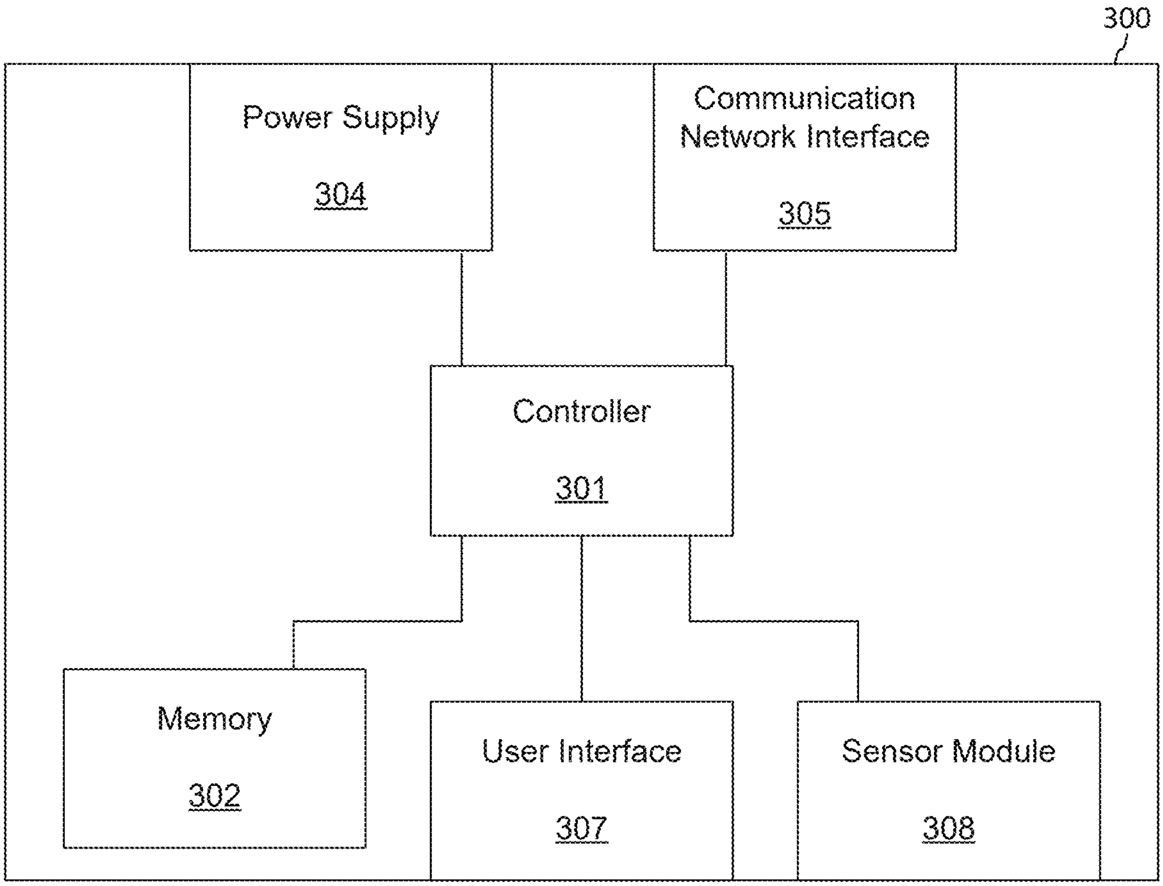

FIG. 3A illustrates a block diagram of a control device and/or a control processor of the control system according to an illustrative embodiment.

Figure 3B:
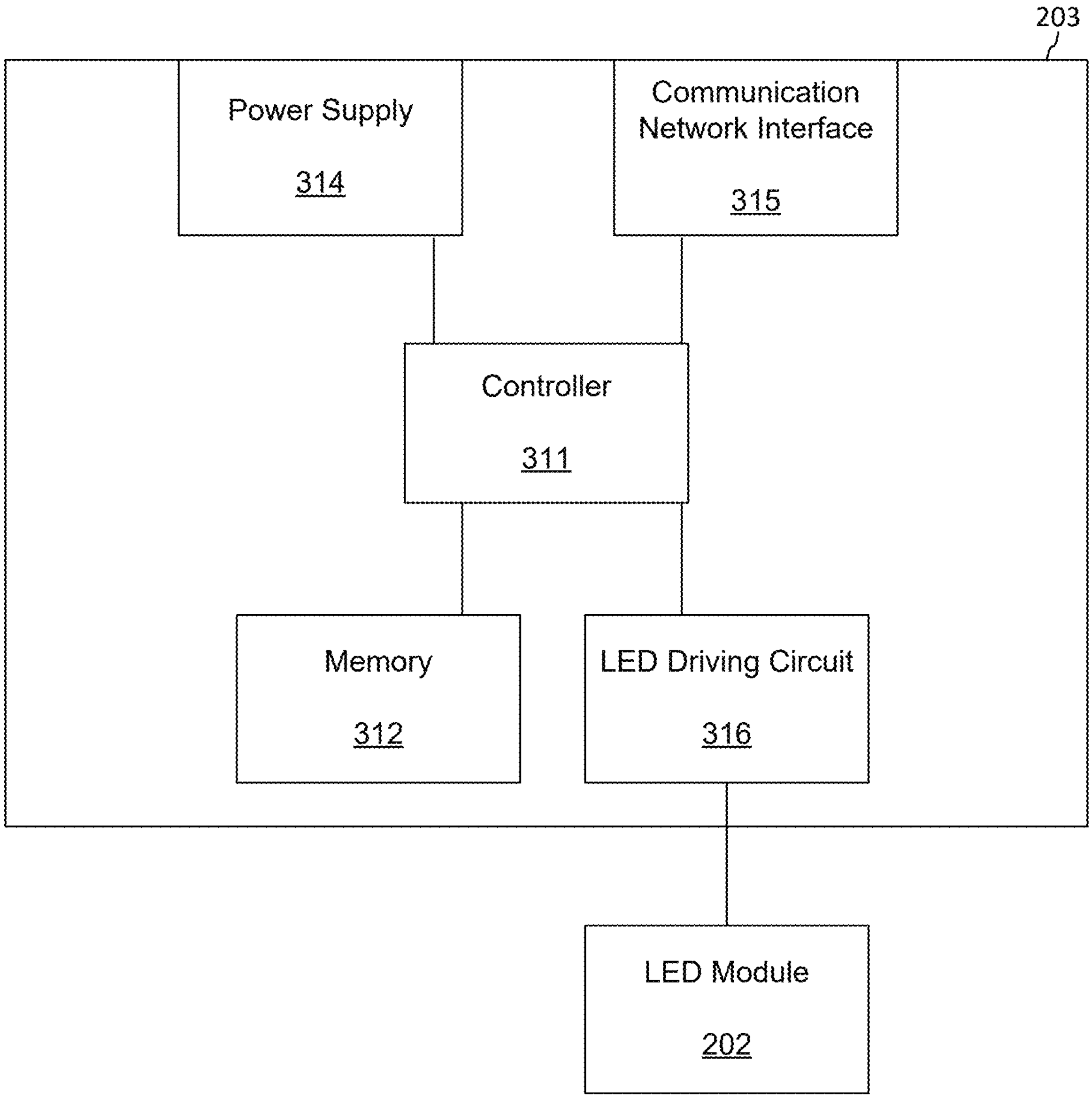

FIG. 3B illustrates a block diagram of a light fixture according to an illustrative embodiment.

Figure 4:
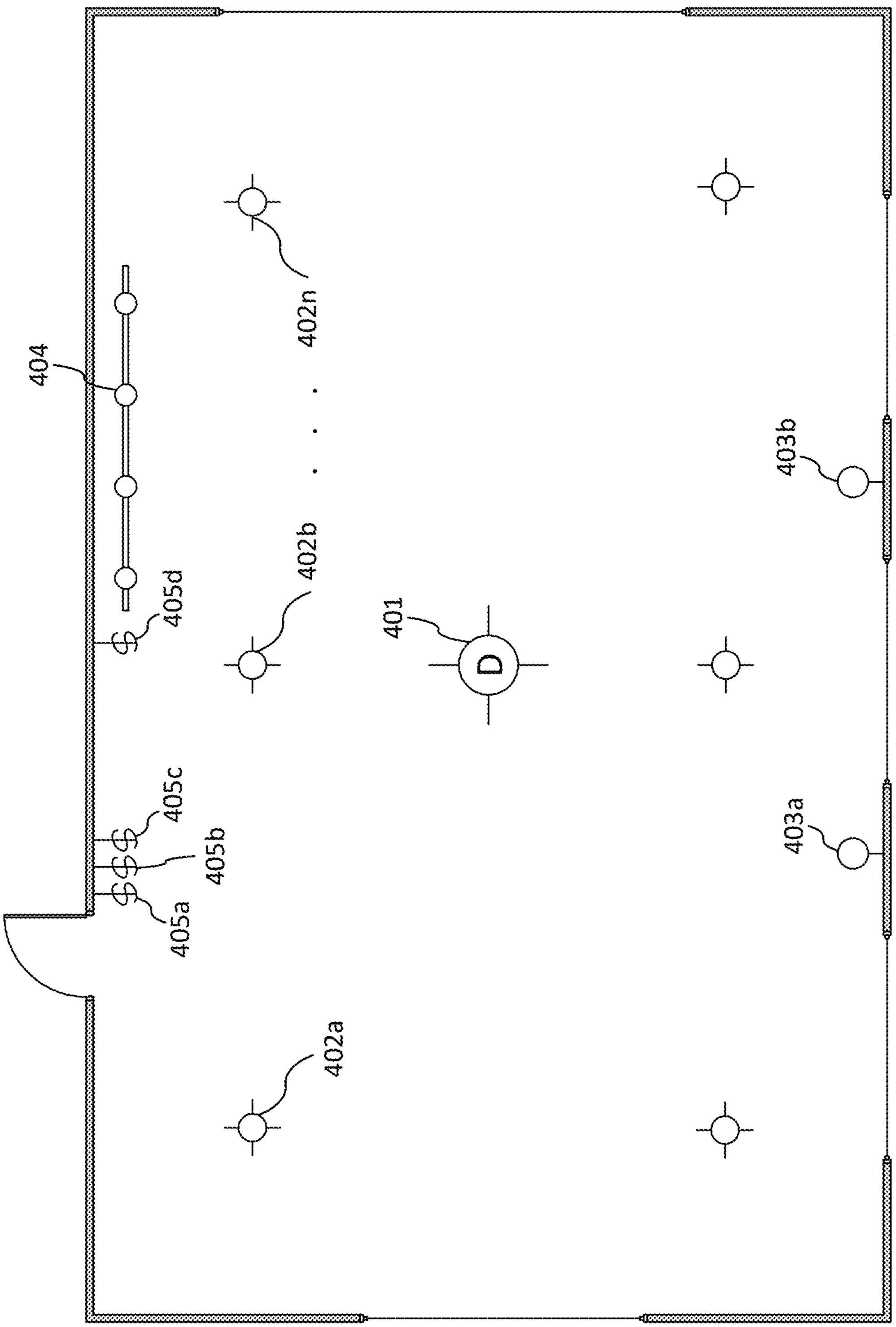

FIG. 4, illustrates an exemplary layout of a room containing a plurality of control devices and lighting devices to be controlled according to an illustrative embodiment.

Figure 5:
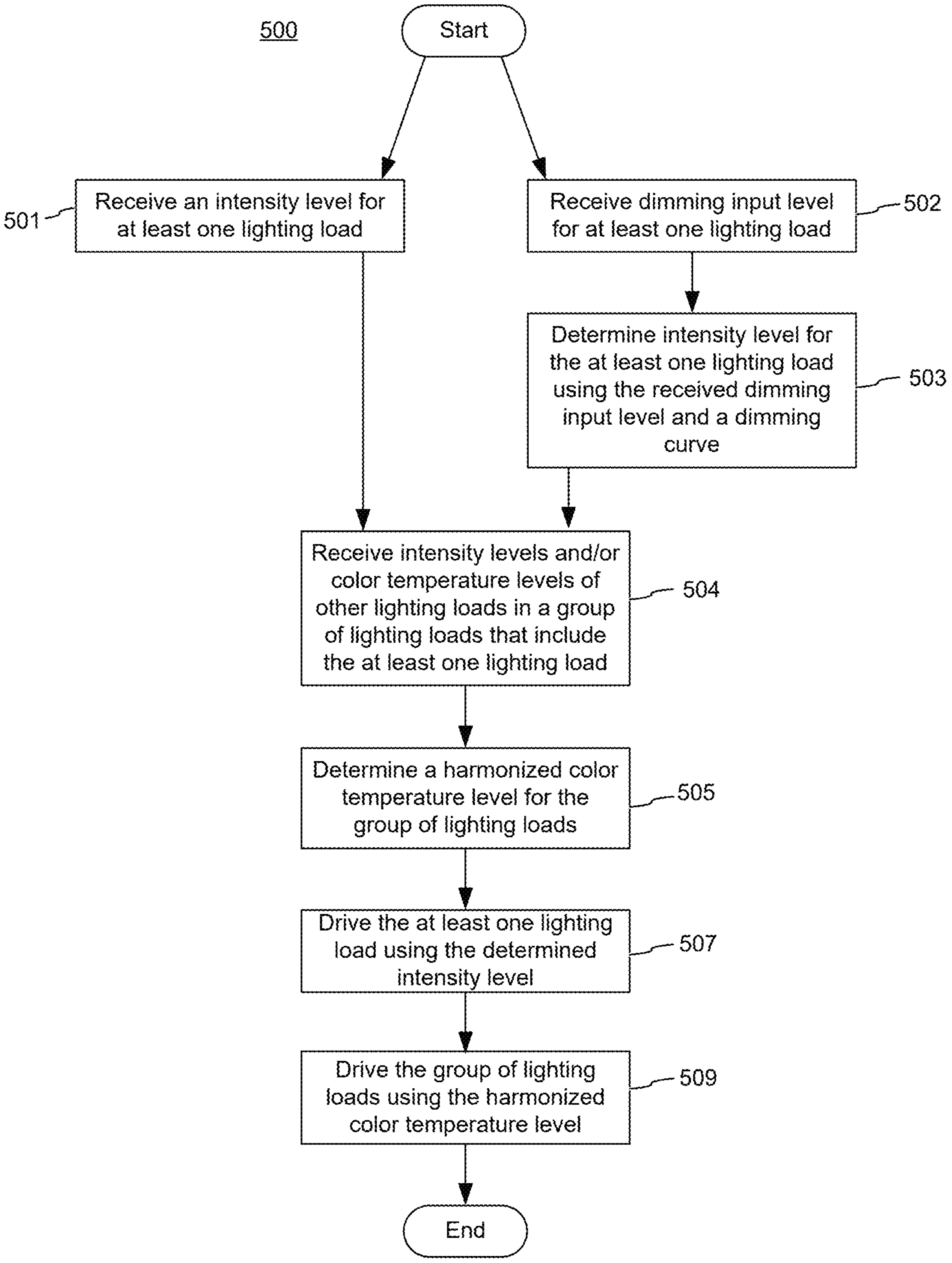

FIG. 5 illustrates a flowchart showing an exemplary method of determining the light intensity level and harmonized color temperature level according to an illustrative embodiment.

Figure 6:
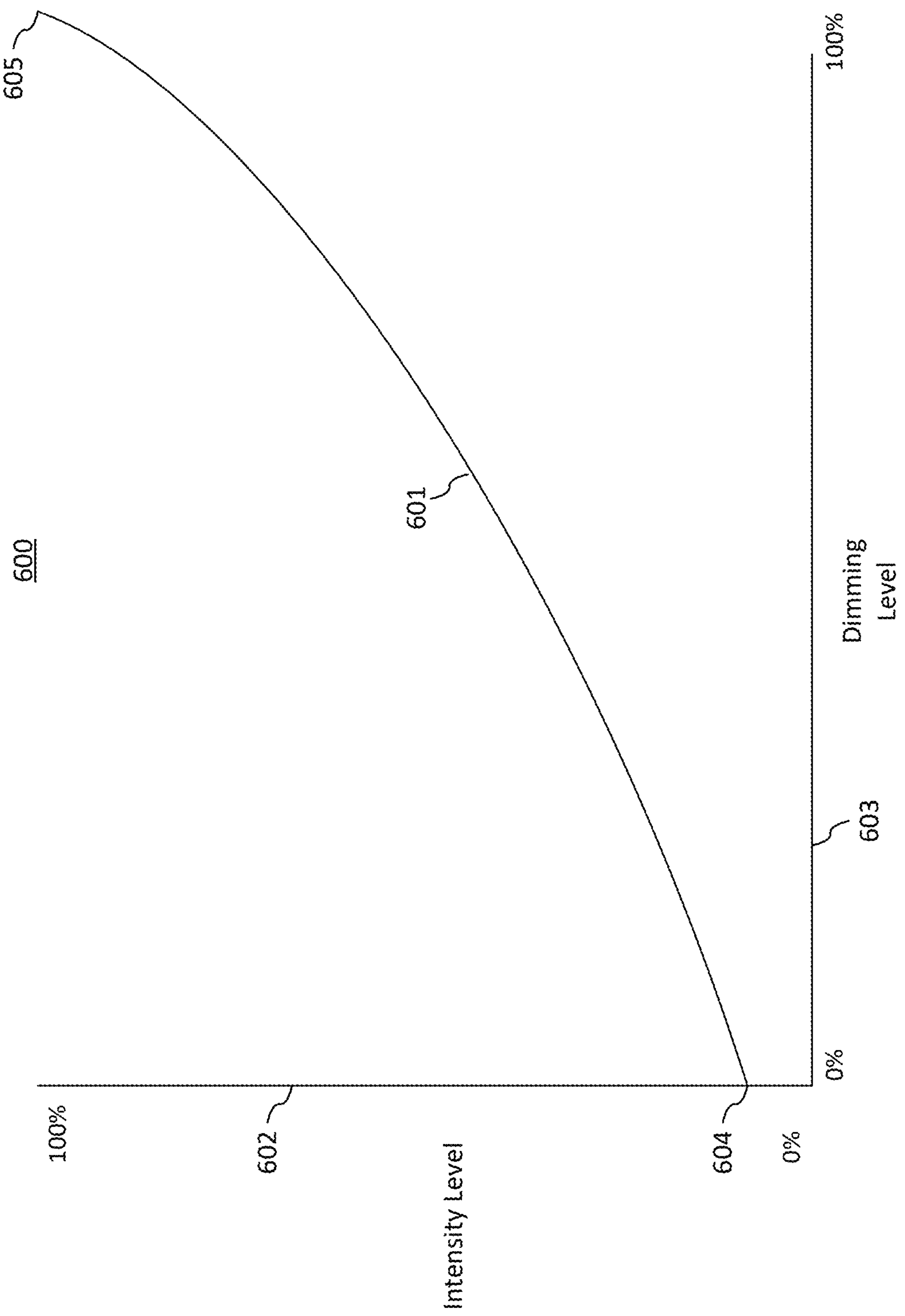

FIG. 6 illustrates a plot representation of a dimming curve according to an illustrative embodiment.

Figure 7:
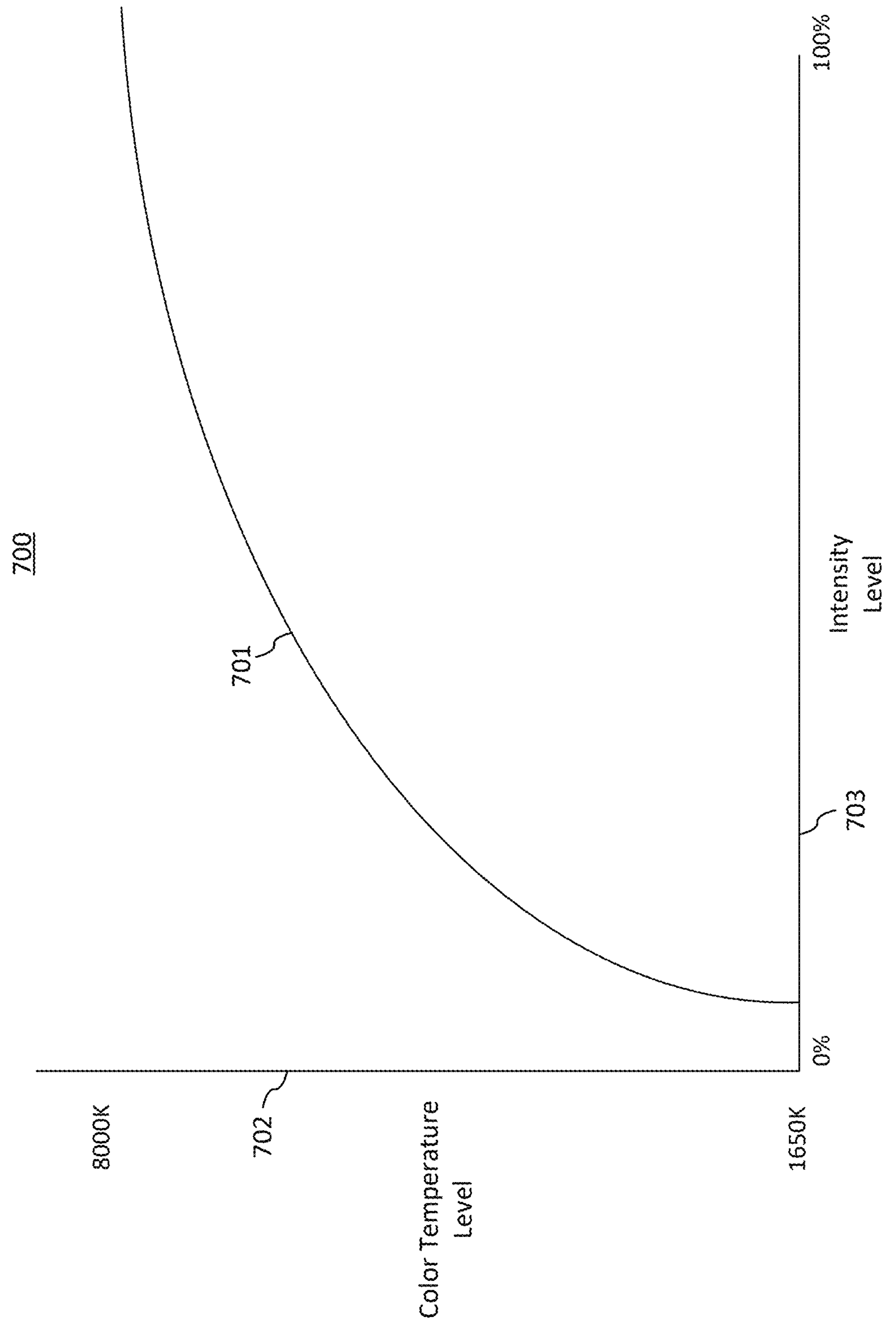

FIG. 7 illustrates a plot representation of a warm-dim curve according to an illustrative embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of device.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

100 Control System
101 Control Processor
102-106 Control Devices
102 Keypad
103 Thermostat
104 Controller
105 Sensor/Light Sensor
106 Touch Screen
107 Buttons
108 Light Bar
109 Display Screen/Touch Screen
110 Local Communication Network
111 Server
112 User Device/Computer
113 User Device/Mobile Device
114 Buttons
115-118 Electrical Loads
115 Lighting Loads/Devices/Fixtures
116 Shading Devices
117 HVAC Equipment
118 Audiovisual Devices
119 Touch Sensitive Touch Screen
120 Wide Communication Network
121 Light Sensor
200 Recessed Light Fixture
201 Housing
202 Light Source/LED Module
203 LED Driver
204 Heatsink
206 Optical Components/Lens
207 Optical Components/Baffle/Trim
213 Terminal Block
214 Junction Box
215 Wire Leads
300 Control Device
301 Controller
302 Memory
304 Power Supply
305 Communication Network Interface
307 User Interface
308 Sensor Module
311 Controller
312 Memory
314 Power Supply
315 Communication Network Interface
316 LED Driving Circuit
400 Room
401-404 Lighting Devices/Lighting Loads
401 Hanging Light
402*a-n* Recessed Lights
403*a-b* Sconces
404 Track Light
405*a-d* Control Devices
500 A Flowchart Showing an Exemplary Method of Determining the Light Intensity Level and Harmonized Color Temperature Level
501-509 Steps of Flowchart 500
600 A Plot Representation of a Dimming Curve
601 Dimming Curve
602 Intensity Levels
603 Dimming Input Levels
604 Minimum Intensity Level
605 Maximum Intensity Level
700 A Plot Representation of a Warm-Dim Curve
701 Warm-Dim Curve
702 Color Temperature Levels
703 Intensity Levels

LIST OF ACRONYMS USED IN THE SPECIFICATION IN ALPHABETICAL ORDER

The following is a list of the acronyms used in the specification in alphabetical order.

AC Alternating Current
ASICs Application Specific Integrated Circuits
AV Audiovisual
COM Communication Port
DC Direct Current HSL Hue, Saturation, Lightness
HSV Hue, Saturation, Value
HVAC Heating, Ventilation, Air Conditioning
IR Infrared
K Kelvins
LED Light Emitting Diodes
NFC Near-Field Communication
PoE Power-over-Ethernet
PWM Pulse Width Modulation
RAM Random-Access Memory
RF Radio Frequency
RGB Red-Green-Blue
RISC Reduced Instruction Set Computer
ROM Read-Only Memory
USB Universal Serial Bus
WPAN Wireless Personal Area Network

MODE(S) FOR CARRYING OUT THE INVENTION

The present embodiments provide systems, methods, and modes for building control systems, and more specifically for harmonized color temperature control of lighting loads. The embodiments of the building control system can be used in small, mid, or large scale residential or commercial installations. While the embodiments are described herein as being implemented in residential installations, they are not limited thereto. The present embodiments may be employed in other types of venues or facilities, including in commercial, retail, entertainment (such as theaters to commission theater lighting), hospitality, or non-profit structures or venues. Additionally, the control system described herein may be implemented for managing and/or controlling an entire building, scaled up to control an entire campus of buildings, or scaled down to control individual floors, rooms, or spaces within a building.

FIG. 1 shows a control system 100 according to an illustrative embodiment. Control system 100 can comprise a plurality of electrical devices, including but not limited to one or more control devices 102-106, one or more electrical loads 115-118, and in some embodiments a central control processor 101. According to one embodiment, control system 100 may be implemented using a central control processor 101 in communication with the control devices 102-106 over a local communication network 110. Control processor 101 operates to communicate with the control devices 102-106 to transmit and/or receive control commands as well as status information. According to another embodiment, the control system 100 may be implemented without a central control processor 101 and the plurality of control devices 102-106 can be interconnected over the communication network 110 to exchange commands and messages. Further, according to an embodiment, the control system 100 can comprise a subset of the system shown in FIG. 1, comprising a lighting control system made up of a plurality of lighting devices 115 and one or more of the control devices 102, 104, 105 and/or 106 connected over the communication network 110 to the control processor 101 and/or to each other. Electrical loads 115-118, such as one or more of the lighting devices 115, may be also connected to the communications network 110 and can be individually addressable by the control devices 102-106 and/or the control processor 101. According to another embodiment, one or more of the electrical loads 115-118, such as lighting devices 115, may comprise loads without network communication capabilities that can be directly wired to and controlled by one or more lighting control devices 102-106, which in turn can communicate with each other and/or with a control processor 101 over the communication network 110.

Communication network 110 may comprise one or more wired, one or more wireless, or a combination of one or more wired and wireless networks. In one embodiment, a wired communication network 110 can be implemented using bus wiring and serial ports. A wired communication network 110 may be governed by a standard or proprietary wired communication protocols, such as Cresnet®, DMX (e.g., DMX512), DALI®, 0-10V, RGBW, or other protocols known in the art, and/or any combinations thereof. The wired communication network 110 can be implemented using bus wiring and one or more network interfaces or ports, such as a communication (COM) port, a universal serial bus (USB) port, a Cresnet® port, an Ethernet port (e.g., RJ-45), DMX port, DALI®, 0-10V low voltage dimming port, RGBW control ports, or the like. In another embodiment, a wireless communication network 110 can comprise one or more wireless personal area networks (WPANs). Communication protocols govern the operation of the wireless network 110 by governing network formation, communication, interferences, and other operational characteristics. The wireless communication network 110 may be governed by standard or proprietary communication protocols, such as infiNET EX®, ZigBee®, Wi-Fi®, Z-Wave®, or other protocols known in the art. The communication network 110 can also implement one or more intermediary device such as gateways, splitters, wireless hubs, or similar devices.

Control devices 102-106 can comprise control devices such as switches, dimmers, or keypads 102, dedicated HVAC control devices or thermostats 103, controllers 104, sensors 105 (such as occupancy, light, or temperature sensors), touch screens 106, or other types of devices utilized in building control or automation. Control devices 102-106 can operate to control one or more functionality of electrical loads 115-118 in response to commands received by the control devices 102-106, from the control processor 101, from remote server 111, and/or from user devices 112 and 113. Electrical loads can comprise lighting devices 115, motorized shading devices 116, HVAC equipment 117, audiovisual (AV) equipment 118, as well as security, appliances, and door locks, among other electrical equipment that may be present within a building. Control devices 102-106 may control the operation of electrical loads 115-118 via electrical signals through for example switches, relays, dimmers, or the like. Although according to another embodiment, one or more of the electrical devices 115-118 may constitute "smart" devices adapted to communicate directly with the control devices 102-106 and/or control processor 101 over the communication network 110, for example to receive control commands and change their operational status. Those skilled in the art will recognize that additional or fewer control devices, loads, or other electrical devices can be integrated with the control system 100 without departing from the scope of the present embodiments. For example, the control system of the present embodiments may be implemented with only lighting control devices with or without a control processor 101.

Sensor 105 can comprise a light sensor configured for detecting and measuring ambient and/or natural light preset in a room and/or coming in through windows. According to an embodiment, light sensor 105 can comprise a photosensor with one or more photocells that may output light intensity values of 0-65535 lux (0-6089 foot-candles). Sensor 105 can communicate the detected light intensity to the control processor 101, and/or control devices 102-106, to for example control the intensity of lighting loads based on the measured ambient and/or natural light levels. According to a further embodiment, light sensor 105 may comprise a light color sensor, such as a multichannel spectral sensor, an XYZ sensor, or the like, capable of detecting color of visible light regardless of luminance. According to another embodiment, one or more of the control devices 102-104 and 106 may contain a built-in light sensor, such as light sensor 121 on keypad 102, for controlling the intensity of associated lighting loads and/or their user interfaces, such as backlit buttons and display screens are discussed below. Sensor 105 can alternatively comprise an occupancy sensor, such as an infrared sensor that generates a signal based on sensed infrared radiation of the monitored area. Although other sensors may be utilized without departing from the scope of the present embodiments, such as photosensors, ultrasonic sensors, various motion sensors, occupancy sensors, proximity sensors, sound sensors, microphones, temperature sensors, or the like.

Control system 100 can further communicate with a remote server 111 via network 120, such as a wide communication network, to provide enhanced services and information to the control system 100. Control processor 101 can communicate with server 111 to report data, obtain various data collected by the remote server 111, and/or to transmit or receive control commands. Control system 100, and/or any one of its devices 101-106 and/or 115-118, can also communicate with one or more user devices, such as a computer 112 and a mobile device 113, via the wide communication network 120, a local wired or wireless communication network 110, via a wired connection, via a short range radio link, such as Bluetooth, NFC, or the like, or via any combinations thereof. User devices 112 and 113 may allow a user to configure and commission the control system 100 or to control and/or remotely monitor the system's lighting, climate, and security, for example, from another location.

Referring to FIG. 3A, there is shown an illustrative block diagram of the electrical components of a control device 300, which may include the control devices 102-106 and/or the control processor 101, or other control components of the control system 100. Control device 300 may comprise a controller 301, a memory 302, a power supply 304, a communication network interface 305, a user interface 307, and a sensor module 308. The control device 300, however, may comprise additional or fewer components known in the art.

Power supply 304 provides power to the various circuit components of the control device 300 and for regulating voltage. According to an embodiment, the power supply 304 may be connected to a direct current (DC) voltage power source or an alternating current (AC) mains power source and may convert the AC signal to a direct current (DC). Control device 300 may comprise leads or terminals suitable for making line voltage connections. In yet another embodiment, control device 300 may be powered using Power-over-Ethernet (PoE) or via a Cresnet® port. However, other types of connections or ports may be utilized. According to yet another embodiment, power supply 304 may comprise a battery.

Controller 301 may comprise one or more microprocessors, "general purpose" microprocessors, a combination of general and special purpose microprocessors, application specific integrated circuits (ASICs), reduced instruction set computer (RISC) processors, video processors, related chip sets, or the like, or any combinations thereof. Controller 301 can provide processing capability to execute an operating system, run various applications, and/or provide processing for one or more of the techniques and functions described herein. For example, controller 301 of control device 300 may determine and/or receive an intensity level and/or a harmonized color temperature value, as further discussed below, and use or transmit these values to control a lighting load, such as an associated lighting device 115 or an internal lighting load. The controller 301 may further comprise a time clock that enables control of electrical devices or equipment based on time of day events, such a particular time of day indication or a time of day event indication. Memory 302 may be communicably coupled to the controller 301 and can store data and executable code. Memory 302 can represent volatile memory such as random-access memory (RAM), but can also include nonvolatile memory, such as read-only memory (ROM) or Flash memory. In buffering or caching data related to operations of the controller 301, memory 302 can store data associated with applications running on the controller 301.

The control device 300 can further comprise one or more communication network interfaces 305, such as one or more wired and/or one or more wireless communication interfaces, configured for transmitting and/or receiving messages over one or more communication networks, such as the local communication network 110. In various embodiments, the control device 300 can transmit and/or receive messages to or from the control processor 101, other control devices 102-106, connected electrical devices or loads 115-118, one or more user devices 112-113, or other electrical devices of the control system 100, or any combinations thereof. Such messages may comprise control commands, firmware update information, device discovery information, device commissioning information, feedback or status information, such as reporting of lamp hours, lamp state, firmware version, estimated power consumption, or the like, or any combinations thereof. In various aspects of the embodiments, control device 300 can both receive the electric power signal and control commands through a PoE interface. A wired communication interface 305 may be configured for bidirectional communication with other devices over a wired network, for example by connecting the control device 300 to a wired network using a terminal block. A wired communication interface 305 may be configured for bidirectional communication with other devices over a wired network. The wired interface can represent, for example, a communication (COM) port, a universal serial bus (USB) port, a Cresnet® port, an Ethernet port (e.g., RJ-45), DMX port, DALI®, 0-10V low voltage dimming port, RGBW control ports, or other wired interfaces known in the art. A wireless network interface 305 may be configured for bidirectional wireless communication with other electronic devices over a wireless network. In various embodiments, the wireless interface can comprise a radio frequency (RF) transceiver, an infrared (IR) transceiver, or other communication technologies known to those skilled in the art. In one embodiment, the wireless interface communicates using a standard or proprietary communication protocol, such as infiNET EX®, ZigBee®, Wi-Fi®, Z-Wave®, or other protocols known in the art. Control device 300 can be integrated with the control system 100 and can receive or transmit control signals from or to other control devices 102-106, the control processor 101, and/or the electrical devices 115-118, either directly or through an intermediary device such as a gateway and/or a wireless hub, or a similar device. In yet another embodiment, the communication network interfaces 305 may also comprise a short range wireless interface, such as a Bluetooth wireless interface, a near-field communication (NFC) interface, or other communications known in the art, to enable wireless communication with proximately located wireless devices, such as a mobile device 113 (e.g., a smartphone or a tablet), a portable computer 112, or other portable electronic devices known in the art.

Control device 300 may further comprise one or more forms of user interfaces 307, such as buttons, touch screens, peripheral devices such as remote controls, or other user interfaces know in the art for receiving user input, or any combinations thereof. Control device 300 may be configured to receive control commands from the user via user interface 307 and, either directly or through a control processor 101, control and/or transmit the control command to a load (such as a light, fan, window blinds, etc.) to control an operation of the load based on the control commands. User interface 307 may be further used to provide feedback to the user, such as in the form of light, display, sound, haptic, or the like. For example, control device 300 may comprise one or more light sources, such as light emitting diodes (LEDs), that may be used for backlighting, status indication, mode indication, decorative elements, or the like. Accordingly, control device 300 may comprise an LED driving circuit such as circuit 316 (FIG. 3B), and an LED module such as module 202, as further discussed below. Other types of user interfaces may be used without departing from the scope of the present embodiments, such as touch screens, light indicators, sound indicators, or the like. Referring to FIG. 1, keypad 102 may, for example, comprise one or more buttons 114 for receiving user input. Although other user interfaces may be used such as sliders, turn knobs, rockers, touch buttons or sliders, or the like. Each button 114 may be associated with a particular load 115-118 and/or to a particular operation of one or more loads. For example, buttons 114 may be used to turn a load on or off or to control a dimming setting of a lighting load, or one or more of the buttons 114 may correspond to different preset lighting scenes. Buttons 114 of keypad 102 may be backlit using LEDs and/or may comprise status indicating LEDs for visibility and/or to provide status indication of the button 114. Buttons 114 may contain indicia disposed thereon to provide a designation of each button's function, which may be backlit using the LEDs. According to an embodiment, thermostat 103 may comprise backlit touch buttons 107 for raising or lowering temperature, a backlit screen 109 for indicating the status of the thermostat and displaying temperature levels, and/or status and mode light indicating elements, such as a light bar 108. Touch screen 106 may comprise a backlit touch sensitive touch screen 119 that may display the operation of the system 100 as well as to allow a user to control various system functions or loads via selection of one or more objects on the screen. According to an embodiment, it may be desirable to match the color temperatures of the user interface light sources, such as LEDs or display screens, of the control devices 102-106 to the harmonized color temperature of the lighting loads 115 in a room according to the teachings of the present embodiments as discussed below.

Referring back to FIG. 3A, control device 300 may further contain sensor module 308, such as a light sensor, or other type of sensor as discussed with reference to sensor 105 above. Sensor module 308 may be used to control the operation of the control device 300 and/or the operation of one or more electrical loads or devices 115-118 as discussed above. For example, sensor readings from a light sensing module 308 may be used to control the intensity and/or color temperature of lighting loads 115 and/or backlight LEDs of the user interface 307 of the control device 300, such as via the curves discussed below.

Other devices in the control system 100, such as "smart" electrical loads, may comprise similar configuration, in terms of having a power supply 304, a controller 301, a memory 302, and a network interface 305 to communicate with the control devices 102-106, other electrical loads or devices 115-118, and/or the control processor 101 of the control system 100.

Control system 100 can further comprise a plurality of lighting devices 115 that can emit a plurality of color temperatures. Such lighting devices 115 can be controlled as lighting loads by control devices 102-106, or they can also act as control devices and directly communicate with the control system 100 over the local communication network 110. FIG. 2 illustrates a perspective view of an exemplary lighting device 115 according to an illustrative embodiment. As an illustration, lighting device 115 is shown in the form of a recessed light fixture 200. However, the present embodiments may be implemented in other types of lighting devices or loads, such as, but not limited to, retrofit LED light bulbs, pendants, track lighting, sconces, chandeliers, undercabinet lighting, lighting strips, or the like. Light fixture 200 can comprise housing 201 sized to be mounted in the ceiling and for housing electrical and mechanical components therein. The electronic and mechanical components of the light fixture 200 may include at least one light source such as an LED module 202, at least one LED driver 203, a heatsink 204, and optical components such as a lens 206 and a baffle with a trim 207. Although the light fixture 105 may comprise a different configuration and components known in the art depending on light fixture implementation, configuration, and application. The heatsink 204 is adapted to be in thermal conductive contact with the LED module 202 and/or the LED driver 203 to dissipate heat away from and cool the electrical components of the light fixture 200.

The light source 202 of light fixture 200 may be adapted to emit a plurality of colors and/or color temperatures and may comprise an LED module comprising one or more LED elements disposed on a printed circuit board. The LED module 202 may be electrically connected to the LED driver 203 which independently controls and powers the LED elements to emit light. According to one embodiment, each LED element may comprise a multicolored light emitting diode (LED), such as a red-green-blue LED (RGB LED), comprising of red, green, and blue LED emitters in a single package. According to an embodiment, each LED emitter can be independently controlled at a different intensity using a pulse width modulation (PWM) signal by a constant current LED driver with output values ranging between 0 and 65535 for a 16-bit channel—with 0 meaning fully off and 65535 meaning fully on. Varying these PWM values of each of the red, green, and blue LED emitters allows the LED element to create any desired color within the device's color gamut, including any desired color temperature of white within a range of between about 1650 Kelvin (K) (warm colors) and about 8000K (cool colors), although other color temperature ranges may be used or achieved. According to other embodiments, LED elements can comprise other color combinations of LED emitters, and/or can also comprise one or more white emitters. The present embodiments can also be implemented with LEDs capable of producing only a limited number colors. Furthermore, the present embodiments can be used with LEDs that can emit different color temperatures of white, such as color tunable or tunable white LEDs, which can for example vary color temperatures anywhere between about 1650K and about 8000K, although that range can differ. To vary color temperatures, the LEDs may comprise a plurality of white LEDs or white LED emitters with varying white color temperatures where mixing these LEDs can produce a desired color temperature. According to another embodiment, the LEDs may comprise a plurality of predetermined color temperature settings emitted by a plurality of white LEDs, such as for example LEDs with three color temperature settings of 3000K, 4000K, and 5000K, although other number of settings and/or color temperature levels can be utilized. Light source 202 may alternatively comprise different technology currently known or later developed capable of producing different colors of light, including different color temperatures of light.

Referring to FIG. 3B, there is shown an illustrative block diagram of the electrical components of a lighting device 115 comprising the LED driver 203 and the LED module 202. The LED driver 203 is electrically connected to and regulates the power supplied to the LED module 202 to control the operation of the LED module 202 in a variety of ways, including, but not limited to, turning the LED module 202 on and off, dimming, incremental dimming, such as a high-medium-low operation, and adjusting the color of the light output, including color temperature control or full color control, or the like. The LED driver 203 may comprise a controller 311, memory 312, a power supply 314, a communication interface 315, and an LED driving circuit 316.

The LED driver 203 may be connected to a power supply 314 to receive power. Power supply 314 may be either packaged in the same package as the LED driver 203 or it may be external to the LED driver 203 and may be located, for example, in a junction box 214 connected to or housed in the housing 201. Power supply 304 provides power to the various circuit components of the light fixture 200 and for regulating voltage and may comprise similar configuration as power supply 304 discussed above. As shown in FIG. 2, light fixture 200 may comprise wire leads 215 for making line voltage connections within a junction box 214. In yet another embodiment, light fixture 200 may be powered using Power-over-Ethernet (PoE) or via a Cresnet® port. However, other types of connections or ports may be utilized.

The controller 311, memory 312, and/or communication network interface 315 may comprise similar configuration as controller 301, memory 302, and network interface 305, respectively, discussed above. In various embodiments, LED driver 203 can transmit and/or receive messages to or from the control processor 101, other connected loads 115-118 such as other lighting devices 115, one or more control devices 102-106, one or more user devices 112-113, and/or other electrical devices of the control system 100, or any combinations thereof. Such messages may comprise control commands, firmware update information, device discovery information, device commissioning information, feedback or status information, such as reporting of lamp hours, lamp state, firmware version, estimated power consumption, or the like, or any combinations thereof. In various aspects of the embodiments, the LED driver 203 can both receive the electric power signal and control commands through a PoE interface. The communication network interface 315 may comprise one or more wired, wireless, and/or a combination of wired and wireless interfaces as discussed above. For example, the light fixture 200 may be connected to a wired network using a terminal block 213 (FIG. 2).

The LED driver 203 may comprise one or more LED driving circuits 316 controlled by the controller 311 to output one or more drive signals to one or more LED modules 202 to perform a desired function. Each drive signal can comprise a PWM signal or a similar signal, which drives the individual LED emitters of each LED element of the LED module 202. According to an embodiment, the controller 311 of light fixture 200 may determine and/or receive an intensity level and/or a harmonized color temperature value, as further discussed below, from a control device 102-106 and/or the control processor 101 and set the LED driving circuit 316 at these levels to be emitted by the LED module 202.

Referring to FIG. 4, there is shown an exemplary layout of a room 400 containing a plurality of lighting devices or lighting loads 401-404 to illuminate various areas and/or to create lighting effects. These lighting loads 401-404 may be controlled individually, or one or more of these lighting loads 401-404 may be controlled as a group via one or more control devices 405*a-d*, such as dimmers or keypads, and/or by a control processor 101. These grouping may be formed physically by electrically connecting a plurality of lighting loads to a single control device, which may then communicate with other control devices and/or the control processor to send and receive commands. According to another embodiment, these groupings may be formed logically by logically associating one or more control devices with one or more lighting loads. As an illustrative example, room 400 may contain a hanging light 401 controlled by control device 405*a*, a plurality of grouped recessed lights 402*a-n* controlled by control device 405*b*, sconces 403*a-b* controlled by control device 405*c*, and a track light 404 controlled by control device 405*d*. According to another embodiment, control devices 405*a-d* may be integrated into a single control device with a plurality of buttons each associated with a particular lighting load. Control devices 405*a-d* may communicate with each other, with the lighting devices 402*a-n*, and/or with a control processor 101.

Control devices 405*a-d* may control the intensity level and associated color temperature of lighting loads or lighting devices 401-404 based on desired intensity levels or dimming input level. Each of the different light sources 401-404 in the room 400, or groups of light sources (e.g., 402*a-n* and 403*a-b*), may be controlled by different control devices 405*a-d*, the control processor 101, and/or other devices of the control system 100, at different intensity levels. This may be because different lighting effects may be desired. For example, handing light 401 may be controlled to a 50% intensity level to illuminate a table below, while recessed lights 402*a-n* and sconces 403*a-b* may be controlled to a 10% intensity level to give a calming effect, and track lights 404 may be controlled at 75% to illuminate artwork. In a typical installation, the different lighting levels in the room may result in different color temperatures, which is not pleasing or desired effect. To solve this, according to the present embodiment as further discussed below, while the intensities vary, one or more devices of the control system 100 determine a harmonized color temperature level such that the perceived color temperature from the different light sources 401-404 in the room 400 is set to an "optimal" color temperature that is substantially the same across the lighting loads in the room 400.

Referring to FIG. 5, there is shown a flowchart 500 for determining the light intensity level and the harmonized color temperature level according to an illustrative embodiment. The light output intensity level and the associated color temperature may be determined using the controller 301 of one or more of the control devices 405*a-d* or of the control processor 101, the controller 311 of one or more of the lighting devices 402*a-n*, other control devices in the control system 100, or any combinations thereof. For example, a controller 301 of control device 405*a* may receive a dimming input from a user to dim the lighting load 401 and in response implement steps 502-503 and 507-509, while the harmonized color temperature level may be determined using the control processor 101 in steps 504-505, by communicating with and polling control devices 405*a-d* in room 400 for their current intensity levels and transmitting the determined harmonized color temperature level to the control devices 405*a-d* in the room 400. According to another example, the controller 301 of control device 405*a* may implement steps 501-509 by communicating with and polling other control devices 405*b-d* for their current intensity levels, determining a harmonized color temperature level, and then transmitting the determined harmonized color temperature level to the other control devices 405*b-d* in the room 400. For the purposes of illustrating the present embodiments, steps 501-509 are described below as being performed by controller 301 of control device 405*a*, although one or more of the steps may alternatively be executed by the controller 301 of other control devices 405*b-d* (such as a master device), the controller 301 of control processor 101 or controller 104, by one or more of the controllers 311 of the lighting loads 401-404, or by any combinations thereof.

The process in FIG. 5 may be triggered by a command to change an intensity level of at least one lighting load. The intensity level may be received and/or determined in a variety of ways. For example, in step 501, the controller 301 of control device 405*a* may receive a target intensity level for at least one light load from one or more of the other control devices 405*b-d*, from one or more of the lighting devices 402*a-n*, from the control processor 101, or from other control devices in the control system 100. The intensity level may be determined by one of these devices using a dimming curve as discussed below, or it may be selected in response to an associated scheduling event, a timer, a time of day, a time of year, or the like.

According to another embodiment, the controller 301 may determine the intensity level using one or more dimming curves. Accordingly, in step 502, the controller 301 may receive a target dimming input level for at least one lighting load. As an example, control device 405*a* may receive a dimming input level for lighting load 401 from a user interface, such as buttons 114, sliders, or the like, via which a user can select a dimming level to control the operation of associated lighting load 401 to dim the intensity of the lighting load 401 and thereby to change its corresponding color temperature. In step 503, the intensity level may be determined using the dimming input level and a dimming curve that correlates the dimming input level with corresponding intensity output level.

Referring to FIG. 6, there is shown a plot representation 600 of a dimming curve 601 as a function of change in intensity level 602 (y-axis) based on changes in corresponding dimming input levels 603 (x-axis). According to the dimming curve 601, as the input dimming level 603 increases, the output intensity level 602 increases, and conversely, as the input dimming level 603 decreases, the output intensity level 602 decreases. Dimming curve 601 may comprise a logarithmic curve as shown in FIG. 6, although according to other embodiments dimming curve 601 may comprise one or a plurality of segments of linear curves, exponential curves, irregular curves, or the like, or any combinations thereof. Dimming curve 601 may be represented in the form of a function, an equation, a lookup table, or the like, or any combination thereof. Dimming curve 601 may be preset for a light source, or it may be determined using a minimum intensity level 604 that corresponds to 0% dimming level and a maximum intensity level 605 that corresponds to 100% dimming level. LED sources, for example, may not turn on at 0% intensity level due to insufficient current and therefore the intensity level could be set at some point above 0% intensity when the dimming level is at 0%, such as for example to 2% intensity, to ensure the light source turns on. Similarly, LEDs may reach their maximum brightness below 100% intensity levels, and therefore could be set at some point below the 100% intensity when the dimming level is at 100%, for example to 60% intensity. Although according to another embodiment, the intensity level may equivalently correspond to the dimming level.

According to yet another embodiment, the intensity level may be determined based on an input from one or more sensors. For example, the intensity level may be determined based on a light sensor input level received from an external light sensor 105 or internal light sensor 121 and a dimming curve that correlates light sensor input levels with corresponding intensity output levels. For example, according to such dimming curve, as the light sensor input levels increase, the output intensity level may decrease, and as the light sensor input levels decrease, the output intensity level may increase. Such dimming curve may be represented in the form of a function, an equation, a lookup table, or the like, or any combination thereof.

Referring back to FIG. 5, in step 504, the controller 301 may then receive the current intensity levels and/or the current color temperature levels of other lighting loads 402-404 in a group of lighting loads that include the at least one lighting load 401. As an illustrative example, control devices 405*a-b* and/or lighting loads 401-404 can be logically grouped as a group of devices present in room 400—although other grouping may be implemented. Accordingly, controller 405*a* may receive the current intensity levels and/or color temperature levels from other control devices 405*b-d* in room 400. In step 505, the controller 301 may determine a harmonized color temperature level for the group of lighting loads 401-404 in room 400 using the received/determined intensity levels and/or color temperature levels of the lighting loads 401-404. The harmonized color temperature level may be determined in a variety of ways as further discussed below. According to one embodiment, the method or function by which the controller 301 determines the harmonized color temperature may be predetermined. According to another embodiment, a user may select a desired function by which the controller 301 determines the harmonized color temperature from a group of predetermined functions.

According to one embodiment, the controller 301 may use at least one of the intensity level of the at least one lighting load 401 determined in step 503 and the intensity levels of the lighting loads 402-404 received in step 504 to select and/or determine a harmonized intensity level, and use that harmonized intensity level to determine a harmonized color temperature level in step 505. The harmonized intensity level may be determined according to one or more of the following: by determining an average intensity value of the intensity levels of the lighting loads 401-404 in the group, by determining a weighted average based on the total wattage of each lighting load 401-404 in the group, by determining a weighted average based on the total lumen output of each lighting load 401-404 in the group, or by determining a weighted average based on some other ranking supplied by a user (for example, downlights could be given a higher ranking than the under-counter lights because they will have a much greater visual impact). According to another embodiment, a harmonized intensity level may be selected from the intensity levels of the lighting loads 401-404 in the group according to one or more of the following: selecting the lowest intensity level, selecting the highest intensity level, selecting a median intensity level, or selecting the intensity level of a specific lighting load chosen by a user (for example, the user may preset a lighting load, for example downlight 401, as the dominant lighting load and use the intensity level of download 401 as the harmonized intensity level). According to yet another embodiment, the harmonized intensity level may be determined using light level readings from a light sensor 105 in the room 400, or internal light sensor 121, for example by using a dimming curve as discussed above.

The controller 301 may then use the harmonized intensity level to determine a corresponding harmonized color temperature from a warm-dim curve. Referring to FIG. 7, there is shown a plot representation of a warm-dim curve 701 as a function of change in the color temperature levels 702 (y-axis) based on changes in the light intensity or brightness levels 703 (x-axis). The warm-dim curve 701 may comprise a relationship whereas as the intensity level increases, the color temperature level increases, for example from warm to cool light, between about 1650K to about 8000K, although other color temperature ranges may be used without departing from the present embodiments. Accordingly, bright light outputs will result in cool color temperatures, while dim light outputs will result in warm color temperatures which provide more pleasing aesthetics. The color temperature levels can be represented as color values that represent color in a color space, as is known in the art, such as but not limited to CCT (Correlated Color Temperature), RGB (Red-Green-Blue), HSV (hue, saturation, value), HSL (hue, saturation, lightness), XYZ, and xyY color values, or the like. Warm-dim curve 701 may comprise a logarithmic curve as shown in FIG. 7, although according to other embodiments warm-dim curve 701 may comprise one or a plurality of segments of linear curves, exponential curves, irregular curves, or the like, or any combinations thereof. Warm-dim curve 701 may be represented in the form of a function, an equation, a lookup table, or the like, or any combination thereof. According to another embodiment, warm-dim curve 701 may be a direct function of color temperature levels 702 and corresponding dimming input levels.

According to another embodiment, each controller 301 of each control device 405*a-d* may determine its own respective color temperature level corresponding to its current intensity level using a warm-dim curve, such as warm-dim curve 701, which can be the same or different for each control device 405*a-d*. For example, the controller 301 of control device 405*a* may determine its color temperature level that corresponds to the determined intensity level (step 503) using the warm-dim curve 701. The controllers 301 of the remaining control devices 405*b-d* (and/or the controllers 311 of the lighting loads 401-404) may determine their respective color temperature levels that correspond to their current intensity levels using their respective warm-dim curves. Control devices 405*b-d* may then transmit their current color temperature levels, and can also transmit their associated intensity levels, to the control device 405*a*. Control device 405*a* may then determine and/or select a harmonize color temperature from the received/determined group of color temperature levels associated with control devices 405*a-d* in the group.

According to one embodiment, the harmonized color temperature level may be determined by determining an average color temperature level from the plurality of the received/determined color temperature levels. According to another embodiment, the harmonized color temperature level may be determined by determining a weighted average of the received/determined color temperature levels, for example based on a ranking supplied by a user where the user may rank the lighting loads 401-404 according to priority. According to another embodiment, the control device 405*a* may select a harmonized color temperature level from the plurality of received/determined color temperature levels based on the received intensity levels, such as by selecting the color temperature level associated with the lowest intensity level, selecting the color temperature level associated with the highest intensity level, or selecting the color temperature level associated with an average or median intensity level. According to another embodiment, the control device 405*a* may select a harmonized color temperature level from the plurality of received/determined color temperature levels based on the time of day, based on the time of year, and/or selecting the color temperature level of a specific dominant lighting load. For example, the lowest color temperature level may be selected during night and evening hours, a mean or average color temperature level may be selected during the morning and late afternoon hours, and the highest color temperature level may be selected during the day hours. According to another embodiment, the control device 405*a* may select a harmonized color temperature level that corresponds to the color detected by the light color sensor (105/121) capable of detecting color, for example by setting the detected color temperature level as the harmonized color temperature level, or selecting a harmonized color temperature level from the plurality of received/determined color temperature levels that is the closest to the detected color temperature level.

According to an embodiment, the controller 301 of the control device 405*a* may further adjust the harmonized color temperature to a level that all the turned on lighting loads 401-404 can emit. Different lighting loads have different color temperature ranges where their upper and lower color temperature limits may be different from other lighting loads. Other lighting loads may not be able to emit certain color temperature values, such as lighting loads with predetermined number of color temperature values; for example, a lighting load that may be able to only emit five color temperature values of 2700K, 3000K, 4000K, 5000K, and 6000K. The control device 405*a* (or the central control processor 101) may poll and store the color temperature capabilities of the various lighting loads in the room 400. When adjusting the harmonized color temperature, the control device 405*a* may consider only the color temperature capabilities of turned on loads, and ignore loads that are turned off. The control device 405*a* may adjust the harmonized color temperature to the closes color temperature that all the turned on loads can emit. For example, the determined or selected harmonized color temperature may be at 6000K, but lighting load 404 may only emit color temperature of up to 5000K; thereby, the control device 405*a* may adjust the harmonized color temperature to 5000K.

According to yet another embodiment, the control device 405*a* may be configured to control a lighting load, e.g., lighting load 401, with a predetermined warm-dim curve, such as a warm to dim (or dim to warm) retrofit LED bulb. In such an implementation, the control device 405*a* may be programmed to store a warm-dim curve 701 that corresponds to the predetermined warm-dim curve of that light source 401 This can be done by mapping the build-in warm-dim curve of the warm to dim light source 401 and storing that mapped warm-dim curve. This will accommodate adjusting settings of a light source with predetermined or "built-in" warm-dim algorithms where intensity cannot be controlled separately from the color temperature. To keep color temperature consistency, all other tunable loads 402-404 in the room 400 may be adjusted to the color temperature of the warm to dim light source 401 with the built-in warm-dim curve. For example, when the warm to dim light source 401 is dimmed, the control device 405*a* will determine the color temperature corresponding to the dimming or light intensity level using the mapped warm-dim curve and set that color temperature as the harmonized color temperature for lighting loads 402-404. That harmonized color temperature will stay static for all the lighting loads in the room 400 regardless of if the other lighting loads 402-404 are thereafter dimmed, and will change only the next time the dimming level of the warm to dim light source 401 changes.

After determining the harmonized color temperature, in step 507 the controller 301 of control device 405*a* may drive the at least one lighting load 401 at the intensity level determined in step 503 for the lighting load 401, while the other lighting loads 402-404 in the group of lighting loads remain at their current intensity levels. Then in step 509, one or more controllers 301 of control devices 405*a-d* and/or the control processor 101 may control the group of lighting loads, for example all lighting loads 401-404 in room 400, at the determined harmonized color temperature level. For example, the controller 301 of control device 405*a* may transmit the harmonized color temperature level directly or through a control processor 101 to the other control devices 405*b-d* to control the color temperature of their associated lighting loads 402-404 at the harmonized color temperature.

To create a better user experience, instead of implementing immediate changes, the controllers 301 may gradually change the lighting intensities and/or the color temperature levels of the lighting loads 401-404 in the room 400 to the newly determined intensities and color temperature levels. For example, a user may wish to change the intensity of lighting load 401 in the room 400, for example by pressing "raise" or "lower" buttons on a control device 405*a*. There are several ways by which color temperature transition of lighting load 401 and the other lighting loads in 402-404 can be handled. According to an embodiment, the intensity of lighting load 401 can be adjusted first, without changing the color temperature. When the user finishes the raise/lower operation, the harmonized color temperature may be determined for the lighting loads 401-404 in the room 400 and all the lights 401-404 may then be set to the determined harmonized color temperature, or they may transition to the harmonized color temperature over a fade time period so that the change does not appear abrupt. According to another embodiment, the intensity and the color temperature of the lighting load 401 can be adjusted as the user presses the "raise" or "lower" buttons. When the user finishes the raise/lower operation, the harmonized color temperature may be determined and the lights 401-404 may then be set to change or transition to the determined harmonized color temperature. According to another embodiment, the harmonized color temperature can be dynamically calculated in real time as light levels are being adjusted by the user.

In other circumstances, a user using a user interface of control device 405*a* may choose, or the control processor 101 in response to a scheduled event may recall, a predefined lighting "scene" that changes the intensities of a plurality of lighting loads 401-404 in the room 400. In this case, various lights 401-404 in the room 400 may change their intensity levels to predefined levels immediately or over a predefined time period. When recalling a scene, there are various ways that the harmonized color temperature can change in relation to the intensity. All lights 401-404 could be set to the harmonized color temperature first, then fade to their target intensities. All lights 401-404 could fade to their target intensities without changing their color temperature, then the color temperature could be set at the end to the harmonized color temperature. According to another embodiment, the color temperature of each light 401-404 can change as intensities are adjusted in such a way that at the end of the fade all lights 401-404 have smoothly reached the harmonized color temperature. According to yet another embodiment, all lights could adjust their color temperature as per their default "warm dim" curves until they reach the target harmonized color temperature, at which point they would continue adjusting their intensity to the target intensity level. According to a further embodiment, the harmonized color temperature can be dynamically calculated in real time as lights go through their fades and color temperatures can be set to that "interim" harmonized color temperature as fast as possible.

As discussed above, in addition to adjusting the intensities and color temperatures of the lighting loads 401-404, the color temperature of other light sources in the room can also be adjusted to the harmonized color temperature. For example, backlighting of buttons or indication lights on control devices 405*a-d*, or other devices with LEDs or screens in the room, may be adjusted to the harmonized color temperature to match the color temperature of the lighting loads 401-404 in the room.

INDUSTRIAL APPLICABILITY

The disclosed embodiments provide systems, methods, and modes for harmonized color temperature control of lighting loads. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments can be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and can include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted. For example, step 507 of FIG. 5 may be performed after steps 501/503.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

What is claimed is:

1. A system for harmonized color temperature control comprising:

a plurality of load control devices for controlling a plurality of lighting loads installed in a space; and at least one controller comprising a memory storing a warm-dim curve represented by a relationship between a plurality of intensity levels and corresponding color temperature levels, wherein the warm-dim curve comprises a curve wherein as the intensity levels increase the color temperature levels changes from warm color temperature levels to cool color temperature levels, wherein the at least one controller:

receives a control command associated with a target intensity level for at least one of the plurality of lighting loads;

receives current intensity levels of other lighting loads of the plurality of lighting loads;

determines a harmonized color temperature level using the warm-dim curve and at least one of the target intensity level, the current intensity levels, or any combinations thereof;

commands to drive the at least one lighting load at the target intensity level, while the other lighting loads remain at their current intensity levels; and commands to drive the plurality of lighting loads at the harmonized color temperature level.

2. The system of claim 1, wherein the at least one controller receives the control command associated with the target intensity level from at least one of a user interface, a light sensor, in response to a scheduled event indication, or in response to a trigger event.

3. The system of claim 1, wherein the at least one controller is part of one or more of the plurality of control devices, a sensor, a group control processor, a central control processor, and any combinations thereof.

4. The system of claim 1 further comprising a backlit user interface for controlling a function of at least one of the plurality of lighting loads, wherein the at least one controller drives the backlit user interface at the harmonized color temperature level.

5. The system of claim 1, wherein one or more of the plurality of lighting loads comprises at least one of a multicolored light emitting diode module, a tunable white light emitting diode module, a light emitting diode module adapted to emit a plurality of color temperatures, and any combinations thereof.

6. The system of claim 1, wherein the at least one controller determines the harmonized color temperature level from a harmonized intensity level.

7. The system of claim 6, wherein the harmonized intensity level comprises an average intensity level of the target intensity level and the current intensity levels.

8. The system of claim 6, wherein the harmonized intensity level comprises a weighted average of a function comprising at least one of the target intensity level and the current intensity levels, a total wattage of each of the lighting loads, a total lumen output of each of the lighting loads, a ranking value provided from a user input, and any combinations thereof.

9. The system of claim 6, wherein the harmonized intensity level comprises one of a lowest intensity level from the target intensity level and the current intensity levels, a highest intensity level from the target intensity level and the current intensity levels, a median intensity level from the target intensity level and the current intensity levels, and any combinations thereof.

10. The system of claim 6, wherein the harmonized intensity level comprises an intensity level of a dominant lighting load selected from the plurality of lighting loads.

11. The system of claim 6 further comprising a light sensor, wherein the harmonized intensity level comprises an intensity level detected by the light sensor.

12. The system of claim 1, wherein the at least one controller commands to first drive the at least one lighting load at the target intensity level and then to transition the plurality of lighting loads to the harmonized color temperature level over a fade time period.

13. The system of claim 1, wherein the controller adjusts the harmonized color temperature level based on color temperatures that the plurality of lighting loads are capable to emit.

14. The system of claim 1, wherein the stored warm-dim curve corresponds to a predetermined warm-dim curve of the at least one lighting load.

15. A system for harmonized color temperature control comprising:

a plurality of load control devices for controlling a plurality of lighting loads installed in a space; and at least one controller comprising a memory storing a warm-dim curve represented by a relationship between a plurality of intensity levels and corresponding color temperature levels, wherein the warm-dim curve comprises a curve wherein as the intensity levels increase the color temperature levels changes from warm color temperature levels to cool color temperature levels, wherein the at least one controller:

receives a control command comprising a plurality of target intensity levels each associated with at least one of the lighting loads;

determines a harmonized color temperature level using the warm-dim curve and at least one of the received plurality of target intensity levels;

commands to drive the plurality of lighting loads at their associated target intensity levels; and commands to drive the plurality of lighting loads at the harmonized color temperature level.

16. A lighting load control device comprising:

a memory storing a warm-dim curve represented by a relationship between a plurality of intensity levels and corresponding color temperature levels; and a controller adapted to control at least one lighting load of a plurality of lighting loads, wherein the controller:

receives a control command associated with a target intensity level for the at least one lighting load;

receives current intensity levels of other lighting loads of the plurality of lighting loads;

determine a harmonized color temperature level using the warm-dim curve and at least one of the target intensity level, the current intensity levels, or any combinations thereof;

commands to drive the at least one lighting load at the target intensity level and at the harmonized color temperature level; and transmits a command comprising the harmonized color temperature level for controlling the other lighting loads of the plurality of lighting loads at the harmonized color temperature level, while the other lighting loads remain at their current intensity levels.

17. A system for harmonized color temperature control comprising:

a plurality of load control devices for controlling a plurality of lighting loads installed in a space, wherein each load control device comprises a memory storing a warm-dim curve represented by a relationship between a plurality of intensity levels and corresponding color temperature levels;

at least one controller that:

receives a control command associated with a target intensity level for at least one of the plurality of lighting loads;

determines a color temperature level using a respective warm-dim curve and the target intensity level of the at least one lighting load;

receives a plurality of color temperature levels determined using respective warm-dim curves and corresponding current intensity levels of other lighting loads of the plurality of lighting loads;

determines a harmonized color temperature level using at least one of the determined color temperature level of the at least one lighting load, the received plurality of color temperature levels of the other lighting loads, or any combinations thereof;

commands to drive the at least one lighting load at the target intensity level, while the other lighting loads remain at their current intensity levels; and commands to drive the plurality of lighting loads at the harmonized color temperature level.

18. The system of claim 17, wherein the controller determines the harmonized color temperature level by determining an average of the determined color temperature level of the at least one lighting load and the plurality of color temperature levels of the other lighting loads.

19. The system of claim 17, wherein the controller determines the harmonized color temperature level by selecting the harmonized color temperature level from the determined color temperature level of the at least one lighting load and the plurality of color temperature levels of the other lighting loads.

20. The system of claim 19, wherein the controller selects the harmonized color temperature level based on at least one of a target intensity level and the current intensity levels of other lighting loads.

21. The system of claim 20, wherein the controller selects the harmonized color temperature level associated with at least one of a lowest intensity level, a highest intensity level, a median intensity level, or an intensity level associated with a dominant lighting load.

22. The system of claim 19, wherein the controller selects the harmonized color temperature level based on time of day.

23. The system of claim 19 further comprising a light color sensor, wherein the controller selects the harmonized color temperature level based on a color detected by the light sensor.

24. The system of claim 17, wherein the controller adjusts the harmonized color temperature level based on color temperatures that the plurality of lighting loads are capable to emit.

25. A system for harmonized color temperature control comprising:

a plurality of load control devices for controlling a plurality of lighting loads installed in a space; and at least one controller comprising a memory storing a warm-dim curve represented by a relationship between a plurality of intensity levels and corresponding color temperature levels, wherein the at least one controller:

receives a control command associated with a target intensity level for at least one of the plurality of lighting loads;

receives current intensity levels of other lighting loads of the plurality of lighting loads;

determines a harmonized intensity level as a weighted average of a function comprising at least one of the target intensity level and the current intensity levels, a total wattage of each of the lighting loads, a total lumen output of each of the lighting loads, a ranking value provided from a user input, and any combinations thereof;

determines a harmonized color temperature level using the warm-dim curve and the harmonized intensity level;

commands to drive the at least one lighting load at the target intensity level, while the other lighting loads remain at their current intensity levels; and commands to drive the plurality of lighting loads at the harmonized color temperature level.

26. A system for harmonized color temperature control comprising:

a plurality of load control devices for controlling a plurality of lighting loads installed in a space; and at least one controller comprising a memory storing a warm-dim curve represented by a relationship between a plurality of intensity levels and corresponding color temperature levels, wherein the at least one controller:

receives a control command associated with a target intensity level for at least one of the plurality of lighting loads;

receives current intensity levels of other lighting loads of the plurality of lighting loads;

determines a harmonized color temperature level using the warm-dim curve and at least one of the target intensity level, the current intensity levels, or any combinations thereof;

commands to first drive the at least one lighting load at the target intensity level, while the other lighting loads remain at their current intensity levels; and then commands to drive the plurality of lighting loads at the harmonized color temperature level by transitioning the plurality of lighting loads to the harmonized color temperature level over a fade time period.

* * * * *